US008341127B1

(12) United States Patent
Heithcock et al.

(10) Patent No.: US 8,341,127 B1
(45) Date of Patent: Dec. 25, 2012

(54) CLIENT INITIATED RESTORE

(75) Inventors: Jeffery Gordon Heithcock, Lafayette, CA (US); David William Barry, II, El Cerrito, CA (US); Dennis Bishop Jones, El Cerrito, CA (US)

(73) Assignee: EMC Corporation, Hopkinton, MA (US)

( * ) Notice: Subject to any disclaimer, the term of this patent is extended or adjusted under 35 U.S.C. 154(b) by 101 days.

(21) Appl. No.: 11/345,816

(22) Filed: Feb. 2, 2006

(51) Int. Cl.
G06F 17/30 (2006.01)

(52) U.S. Cl. .......................................... 707/679; 707/640

(58) Field of Classification Search .......... 707/200–204, 707/679, 640; 709/203, 219
See application file for complete search history.

(56) References Cited

U.S. PATENT DOCUMENTS

| | | | | |
|---|---|---|---|---|
| 5,150,473 | A * | 9/1992 | Zulch | 707/E17.012 |
| 5,491,752 | A * | 2/1996 | Kaufman et al. | 713/155 |
| 5,673,381 | A * | 9/1997 | Huai et al. | 711/162 |
| 5,778,395 | A * | 7/1998 | Whiting et al. | 707/204 |
| 6,003,044 | A * | 12/1999 | Pongracz et al. | 707/204 |
| 6,023,506 | A * | 2/2000 | Ote et al. | 713/165 |
| 6,038,379 | A * | 3/2000 | Fletcher et al. | 709/200 |
| 6,044,155 | A * | 3/2000 | Thomlinson et al. | 713/155 |
| 6,076,164 | A * | 6/2000 | Tanaka et al. | 713/185 |
| 6,199,178 | B1 * | 3/2001 | Schneider et al. | 714/21 |
| 6,721,766 | B1 * | 4/2004 | Gill et al. | 707/204 |
| 7,558,840 | B1 * | 7/2009 | Howard et al. | 707/204 |
| 7,587,749 | B2 * | 9/2009 | Leser et al. | 709/229 |
| 7,689,861 | B1 * | 3/2010 | Wang et al. | 714/6.12 |
| 7,693,889 | B1 * | 4/2010 | Armorer et al. | 707/653 |
| 8,065,273 | B2 * | 11/2011 | Yueh et al. | 707/645 |
| 2002/0073043 | A1 * | 6/2002 | Herman et al. | 705/64 |
| 2002/0184244 | A1 * | 12/2002 | Hsiao et al. | 707/201 |
| 2003/0046589 | A1 * | 3/2003 | Gregg | 713/201 |
| 2003/0158960 | A1 * | 8/2003 | Engberg | 709/237 |
| 2003/0172130 | A1 * | 9/2003 | Fruchtman et al. | 709/219 |
| 2003/0187853 | A1 * | 10/2003 | Hensley et al. | 707/10 |
| 2004/0078641 | A1 * | 4/2004 | Fleischmann | 714/6 |
| 2004/0107199 | A1 * | 6/2004 | Dalrymple et al. | 707/100 |
| 2005/0033988 | A1 * | 2/2005 | Chandrashekhar et al. | 713/201 |
| 2005/0193031 | A1 | 9/2005 | Midgley et al. | |
| 2005/0289533 | A1 * | 12/2005 | Wang et al. | 707/203 |
| 2006/0047694 | A1 * | 3/2006 | Anderson et al. | 707/102 |
| 2006/0085675 | A1 * | 4/2006 | Popell et al. | 714/6 |
| 2006/0101081 | A1 | 5/2006 | Lin et al. | |
| 2006/0149889 | A1 * | 7/2006 | Sikha | 711/100 |
| 2006/0174076 | A1 * | 8/2006 | Takeda et al. | 711/162 |
| 2007/0061385 | A1 * | 3/2007 | Clark et al. | 707/204 |
| 2007/0180289 | A1 * | 8/2007 | Chai et al. | 714/4 |
| 2008/0304486 | A1 * | 12/2008 | Graessley et al. | 370/392 |

OTHER PUBLICATIONS

Final Office Action for U.S. Appl. No. 11/345,859 mailed May 11, 2012.

* cited by examiner

*Primary Examiner* — Rehana Perveen
*Assistant Examiner* — Tiffany Thuy Bui
(74) *Attorney, Agent, or Firm* — Van Pelt, Yi & James LLP

(57) ABSTRACT

Client initiated restore is disclosed. An indication is received from a client computer that a restore operation is desired. Access to a backup data associated with the client computer is provided to the client computer. The backup data associated with the client computer comprises a subset of a backup data set that includes both backup data associated with the client computer and backup data not associated with the client computer.

20 Claims, 16 Drawing Sheets

US 8,341,127 B1

CLIENT INITIATED RESTORE

BACKGROUND OF THE INVENTION

Some applications traditionally have been run exclusively by system administrators. In some cases, this is because the application requires access to information beyond the privileges of any individual user. For example, a backup application may require access to all user data, essentially requiring system administrator access privileges, in order to provide a comprehensive service. However, if the system administrator is the only one able to run certain applications, the system administrator becomes a bottleneck. It would be useful to enable users to run all, or certain modes, of the applications themselves while still preserving access limitations. In particular, in the context of backup applications it would be useful to enable an individual user to access and use a backup application and associated backup data to restore the user's own files and/or other data.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Enabling a client to restore client-associated data comprising a subset of a body of backup data is disclosed. An indication is received from a client computer that a restore operation is desired. Backup data associated with the client computer is provided to the client computer. The backup data associated with the client computer comprises a subset of a backup data set that includes both backup data associated with the client computer and backup data not associated with the client computer. In some embodiments, requests from multiple client computers to restore data are processed at the same time.

Figure 1:
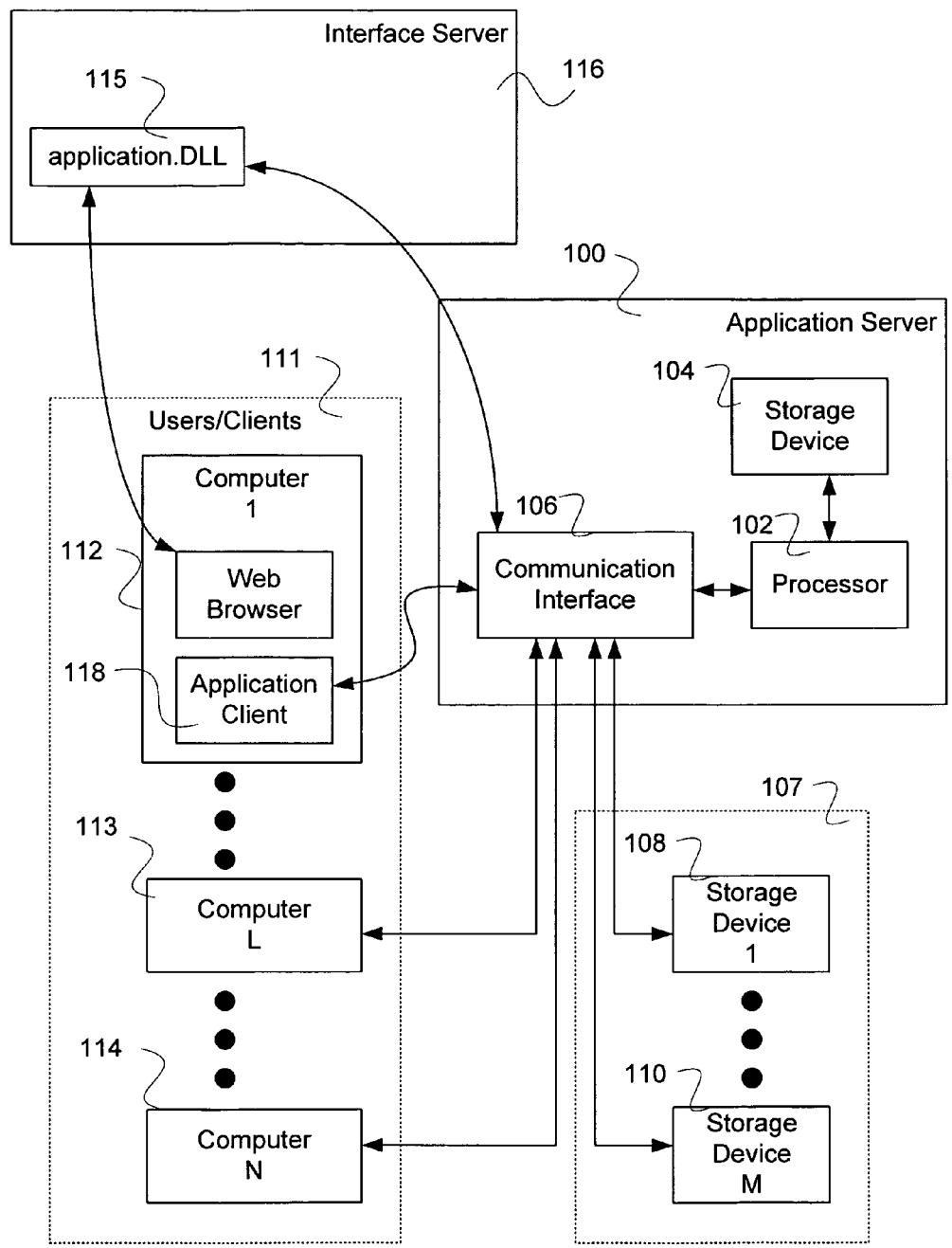
FIG. 1 illustrates an embodiment of a system for enabling a client to restore client-associated data from backup data.

FIG. 1 illustrates an embodiment of a system for enabling a client to restore client-associated data from backup data. In the example shown, application server 100 includes processor 102, which is configured in some embodiments to execute instructions that enable a client to restore; storage device 104 for storing instructions for processor 102; and communication interface 106 capable of receiving communications from and/or sending communications to one or more computers and/or one or more storage devices. In various embodiments, computer 100 comprises a backup server, a database server, a content management system, or any other application server. In various embodiments, communication interface 106 to the one or more computers and the one or more storage devices includes a local area network interface, a wide area network interface, an Ethernet interface, and/or a World Wide Web interface. The plurality of computers (represented in FIG. 1 by first computer 112, an $L^{th}$ computer 113, and $N^{th}$ computer 114) contain files/directories that may need to be accessed (for example, for being backed up or being backup to, for being part of a database, for holding content that is managed by a content management system). In some embodiments, application server 100 handles multiple simultaneous and/or co-pending requests to restore (for example, requests from more than one computer of users/clients 111). In some embodiments, multiple requests to restore are handled by controlling access to an application on application server 100 where multiple restore operations are allowed for predetermined combinations of requested restore operations and executing restore operations. The plurality of storage devices (represented in FIG. 1 by first storage device 108 and $M^{th}$ storage device 110) may contain files/directories that may need to be accessed (for example, for being backed up or being backup to, for being part of a database, for holding content that is managed by a content management system). In some embodiments, communication interface 106 connects to no storage devices. In some embodiments, application server 100 is configured perform a full and/or partial (e.g., incremental and/or differential) backup of one or more of computers 112-114 and/or storage devices 108-110. In some embodiments, all or part of the backup data that is incrementally backed up by application server 100 may be associated with source data associated with application server 100. In some embodiments, the backup data that is backed up may itself reside on application server 100, e.g., on a hard drive. In some embodiments, application server 100 is configured to manage content stored on one or more of computers 112-114 and/or storage devices 108-110.

In the example shown in FIG. 1, users/clients can interact with application server 100 by using a web browser (for example, the web browser in the $1^{st}$ computer 112) to communicate with application server 100 via interface server 116. In some embodiments, interface server 116 comprises a web server. In the example shown, interface server 116 is configured to provide web access to application server 100 at least in part by using application.dll 115. In the example shown, interface server 116 is connected to communication interface 106 of application server 100. In some embodiments, interface server 116 and application server 100 are implemented in a single computer device. In some embodiments, the connection between the $1^{st}$ computer 112 and interface server 116 and the connection between interface server 116 and application server 100 are via one or more networks, such as a local area network, the internet, a wide area network, a wired network, and/or a wireless network, or any other way to connect. In various embodiments, access to managed content data, backup data, or database content associate with application server 100 is achieved using a web interface to login into application server 100 via interface server 116 and to request via interface server 116 an operation with respect to content managed by application server 100. Login information is authenticated in some embodiments by having application server 100 exchange information with application client 118 on the client computer. In some embodiments, the authentication is performed using a communication path, port, protocol, or any other separate way to authenticate the remote access that is different and/or separate, at least in part, than the path used to send login information and/or request an operation. For example, in some embodiments, a client establishes web access and sends login information via http to port 80 of the interface server 116, and the interface server likewise, in an embodiment in which it is running in a separate computer, communicates with the application server 100 via a network communication, e.g., using http via port 80. The login information (e.g., username and associated password) are stored in some embodiments on the client computer, e.g., by a trusted agent such as application client 118 shown in FIG. 1, and login information sent by a client, e.g., by a web browser via the interface server 116 using http via port 80, is authenticated at least in part by having the application server communication via a private protocol and/or port with application client 118 to verify that the username and/or password supplied via the web (http) connection is valid.

In some of the following embodiment figures, a backup application is used as an example for a remote access architecture enabling a client computer to perform an operation such as a restore. However, the remote access architecture enabling a client computer to perform an operation should not be considered as being limited to a backup application and it can be used to enable other applications to have client computers perform operations. For example, user/client computers (for example, user/client $1^{st}$ computer 112) can use the above architecture to read data/content managed or stored by database server/content management server (for example, application server 100). In some embodiments, user/client computers indicate a desire to perform an operation with respect to application server 100 (for example, a database application or a content management application or other application), wherein the user/client is authenticated as able to perform the operation by exchanging information between application server 100 and application client 118 on the user/client computer.

Figure 2:
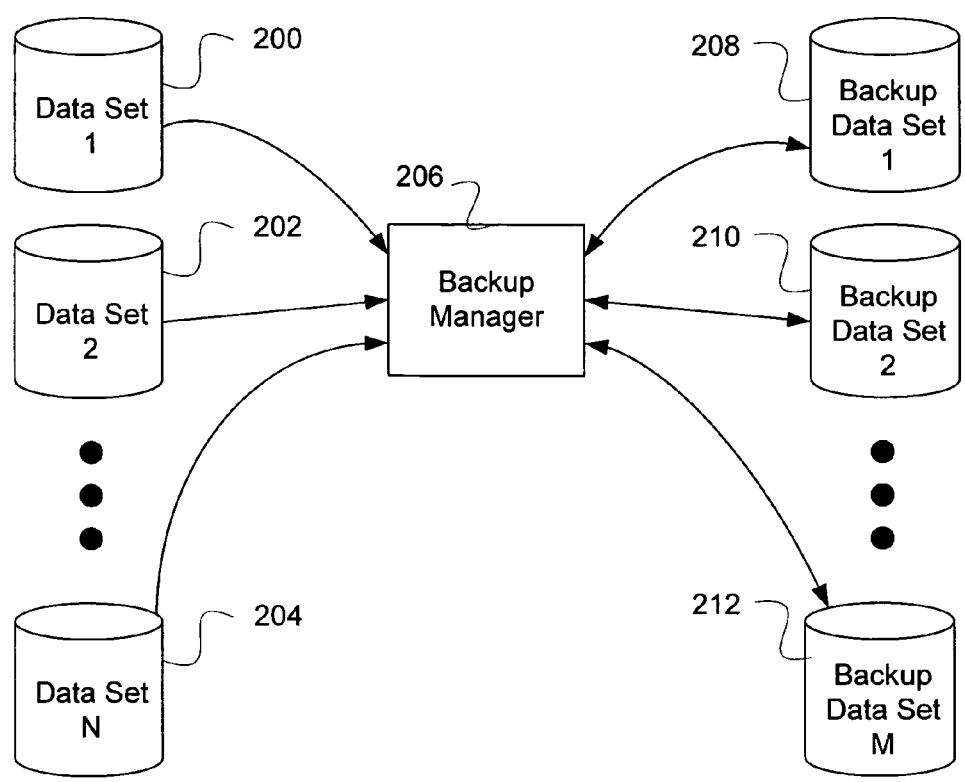
FIG. 2 illustrates an embodiment of a system for enabling a client to restore.

FIG. 2 illustrates an embodiment of a system for enabling a client to restore. In the example shown, a plurality of data sets (represented in FIG. 2 by first data set 200, second data set 202, and $N^{th}$ data set 204) are processed by backup manager 206 (the application) to create a plurality of backup data sets (represented in FIG. 2 by first backup data set 208, second backup data set 210, and $M^{th}$ backup data set 212). In the example shown, backup manager 206 also manages the plurality of backup data sets by performing full and/or partial (for example, incremental or differential backups) for the plurality of backup data sets. In other embodiments, incremental backups may be performed at least in part by a system or process other than a system or process used to create the backup data sets. In some embodiments, incremental backups may be performed with respect to a single backup data set comprising backup data associated with a single set of source data. In some embodiments, a user/client indicates a desire to perform a restore operation, a backup/restore server with which the backup manager 206 is associated authenticates the user/client by exchanging information with a backup/restore client on the user/client computer. In some embodiments, a data set (for example, data set 200) associated with a user/client computer (for example, $1^{st}$ computer 112 in FIG. 1) is backed up using a backup application, which is executing at least in part on an application server (for example, application server 100 of FIG. 1) to a backup data set (for example, backup data set 208) on a storage device (for example, $1^{st}$ storage device 108 of FIG. 1). In some embodiments, the user/client indicates a desire to perform a restore using a web browser which communicates with the backup/restore server via an interface server. In some embodiments, the backup/restore server authenticates the user/client by exchanging information with a trusted client via a different connection from the connection via which the indication of the desire to perform a restore operation was received.

Figure 3:
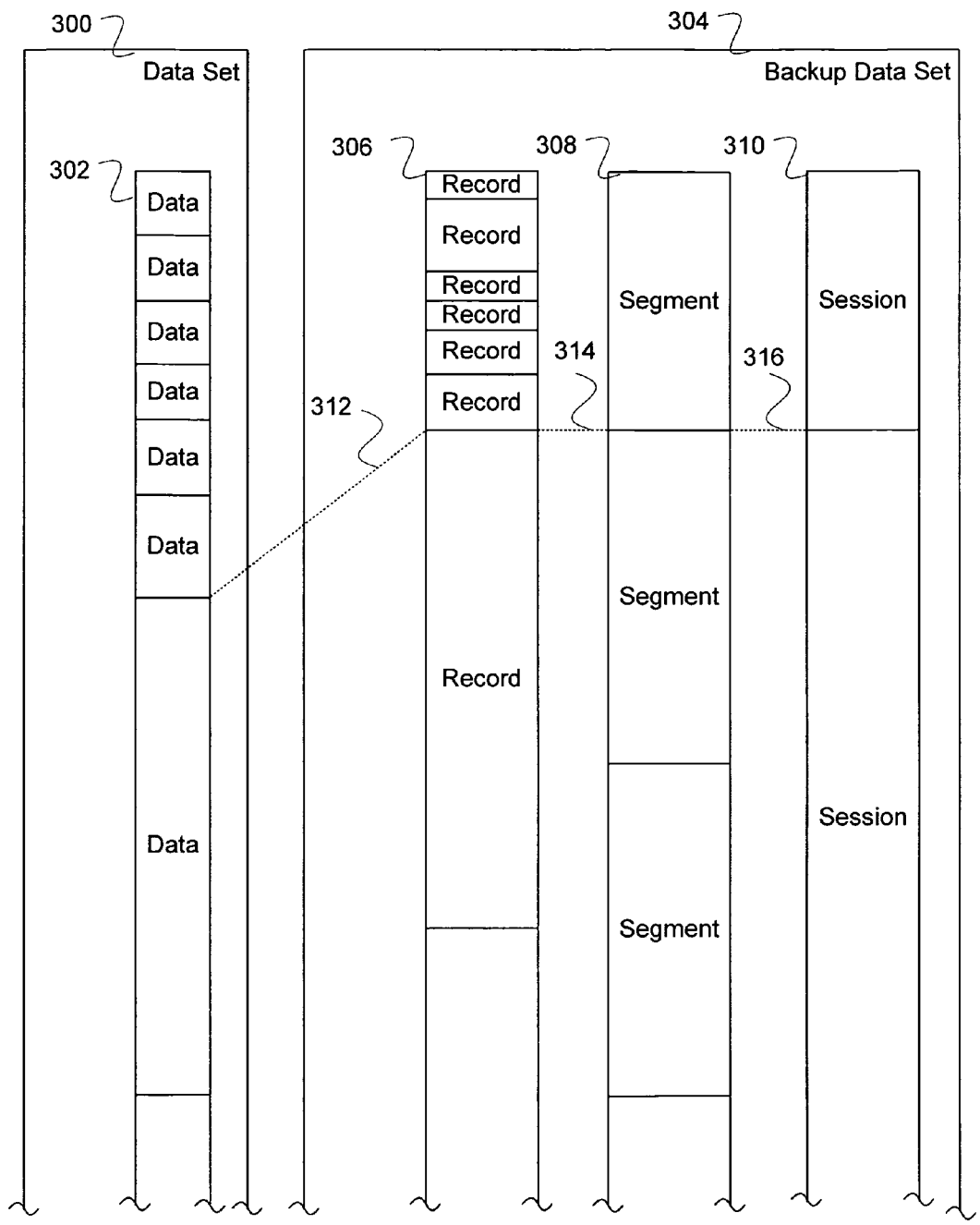
FIG. 3 illustrates an example of data organization in a source data set and a backup data set in one embodiment.

FIG. 3 illustrates an example of data organization in a source data set and a backup data set in one embodiment. In the example shown, data set 300 contains a plurality of data such as data 302. In some embodiments, data 302 comprises a file, a piece of a file, a directory, or a copy of a directory at a particular time. Backup data set 304 contains records corresponding to data in data set 300. For example, record 306 corresponds to data 302. Line 312 indicates a corresponding boundary between data in data set 300 and records in backup data set 304. Records can be smaller than data because the backup manager before storing the records uses data compression. Within backup data set 304 records are organized into sessions. Sessions are groups of backup data stored at the same time. Segment 308 contains record 306. Line 314 indicates a corresponding boundary between records and segments. Segments correspond to a contiguous piece of storage space. The end of a segment may be associated with the end of the backup (i.e. session), the end of the backup storage media, or a maximum limit size. In some embodiments, the maximum limit size is 600 megabytes. Sessions are stored in one or more segments. In the example shown, session 310 contains segment 308. Line 316 indicates a corresponding boundary between sessions and segments. A session may have more than one segment associated with it.

In some embodiments, a backup data set contains backup information in addition to backup data. Backup information may be stored in one or more records comprising a backup data set. In various embodiments, backup information may include a catalog of the contents of the backup set or data to recreate a catalog of the contents of the backup data set. In some embodiments the catalog includes one or more indexes of the source data set at particular backup times and the corresponding locations at which each element of source data is stored on backup media, also called a restore point index. In some embodiments, the backup information includes for each backup session (i.e., operation or event) session data identifying the data actually copied to backup media during the session. In some embodiments, if a file in the index of a data set at a particular backup time already exists in the backup data set because it had not changed from a previous backup, then the file is not stored again during the current backup session, and in some such embodiments the session data is associated with source data that has changed (or is new) since the last backup session. In some embodiments, a restore point index points to data in one or more sets of session data to indicate for each element of source data (e.g., each file and directory) the session(s) during which the element of source data as it existed at the time of the backup with which the restore point index is associated was stored. In some embodiments, the combination of the restore point index and the session data makes it possible to determine for each element of data associated with a restore point index the location on backup media of the corresponding backup data, which in turn makes it possible to use the backup data set to reconstruct the source data set in the form it existed at the time associated with the restore point index, e.g., at the time of a backup operation with which the restore point index is associated. The backup information stored with a backup data set may include other and/or different information about the backup data set, the source data set from which it originated, and/or the backup sessions through which the backup data set was generated.

Figure 4:
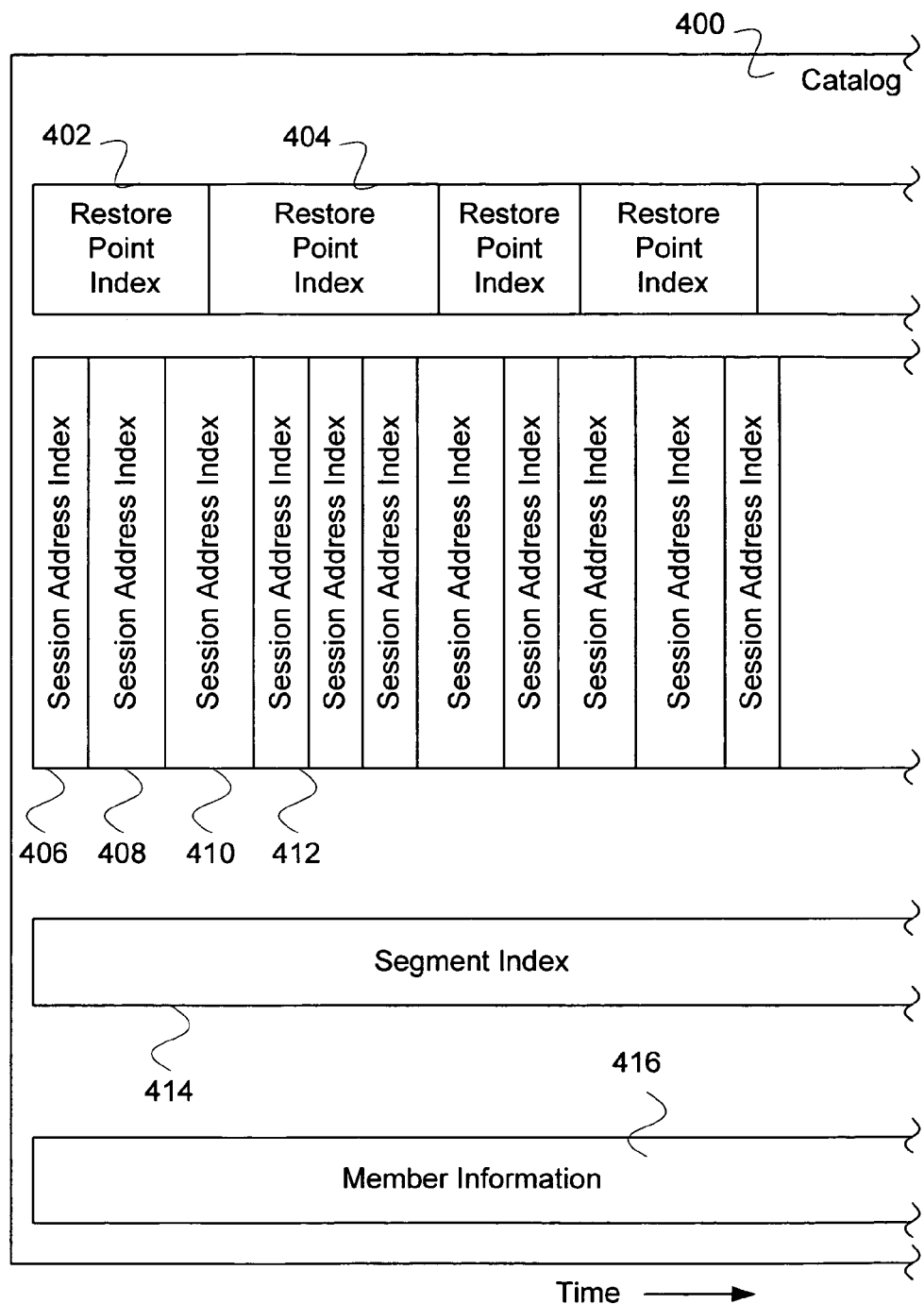
FIG. 4 illustrates an example of a catalog in one embodiment.

FIG. 4 illustrates an example of a catalog in one embodiment. In some embodiments, the catalog is similar to the catalog that can be found in U.S. Pat. No. 5,150,473 entitled DATA STORAGE FORMAT FOR ADDRESSABLE OR SEQUENTIAL MEMORY MEDIA filed Jan. 16, 1990, which is incorporated herein by reference. In the example shown, catalog 400 contains a plurality of restore point indexes and a plurality of session address indexes. As time passes, the number of restore point indexes and session address indexes increases. Restore point index 402 may point to files stored during a number of sessions. For example, restore point index 402 may point to files that are in session address index 406, session address index 408, and session address index 410. The session may not be before the restore point index time because, for example, during a verification step it was realized that a file was not properly saved to the backup set and so a save to the backup set is done subsequent to the session corresponding to the time of the restore point index. Subsequent restore point index 404 may point to files that are in session address index 406, session address index 410, and session address index 412 because, for example, the files indicated by restore point index 404 are no longer the same as any in session address index 408. Catalog 400 contains segment index 414. Segment index 414 is an index of addresses for the segments in the backup data set. In some embodiments, catalog 400 stores a session tree; for example, the session tree may be part of session address index 406.

In some embodiments, a user/client indicates a desire to restore files/data from a selected restore point associated with a backup data set that is accessible to the user/client. In some embodiments, the application server (for example, application server 100) authenticates the user/client by querying the user/client.

Figure 5:
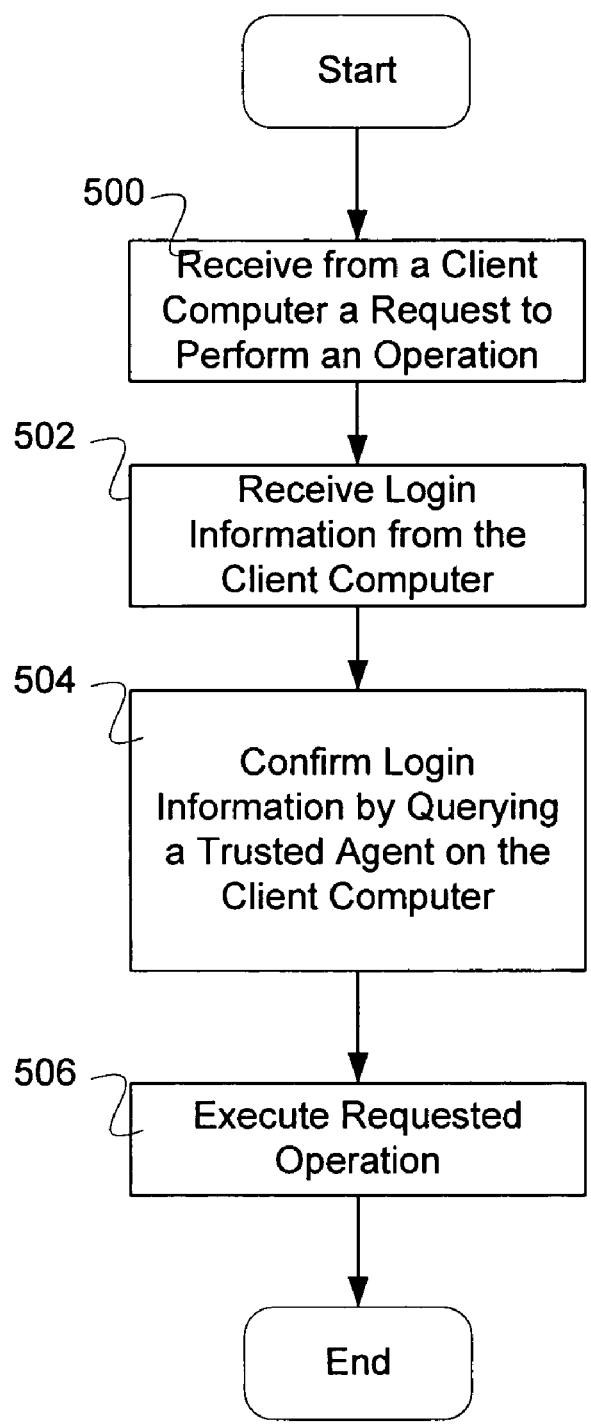
FIG. 5 is a flow diagram illustrating an embodiment of a process for enabling a client to restore.

FIG. 5 is a flow diagram illustrating an embodiment of a process for enabling a client to restore. In some embodiments, the process of FIG. 5 is implemented at least in part on an application server, such as application server 100 of FIG. 1. In the example shown, in 500 a request to perform an operation is received from a client computer. In some embodiments, a client/user is displayed a welcome screen once a request is received to perform an operation. In some embodiments, a web browser is used to communicate with an application server (for example server 100 in FIG. 1), e.g., via an interface server such as interface server 116 of FIG. 1, to indicate that an operation is desired to be performed. In some embodiments, a client/user uses a computer (for example, computer 112, 113, and 114 in FIG. 1) to communicate with an application server to request that an application perform an operation (for example, restore a file from a restore point, search a database for a term, request a service from a content management, business process, or other system, etc.). In 502, login information is received from a client computer. In various embodiments, login information includes one or more of the following: a user name, a user password, a client name, and/or a client password. In various embodiments, the user or client provides login information via a web browser, a proprietary graphical user interface, using a proprietary client software system, or any other appropriate manner of communicating login information from a client computer. In 504, login information is confirmed by querying a trusted agent on the client computer. In some embodiments, the trusted agent comprises a piece of software running on the client that can access trusted information (for example, a password), an acknowledgement method (for example, a secure handshaking method, cryptographic authentication, etc.), or any other appropriate method that can authenticate the client to the server system in order to allow the client to request an operation be performed. In various embodiments, a restore, other backup, content management, database, or other application client (for example, application client 118 in FIG. 1) is running on the client computer and is queried by the application server in order to authenticate the login information (for example, by checking the password or by providing a handshake or some other appropriate authentication). In some embodiments, the login information allows the user to initiate an operation that is appropriate according to the user's access privileges. In 506, the requested operation is executed. In some embodiments, a backup operation request is executed—for example, a restore of one or more files from a selected restore point is executed. In some embodiments, the server handles multiple requests to execute operations (for example, requests from more than one computer of users/clients 111 of FIG. 1). In some embodiments, multiple requests to execute operations are handled by controlling access to the server application where multiple operations are allowed for predetermined combinations of requested operations and executing operations (for example, controlling access for executing multiple restore operations from one or more client computers by checking if a requested restore operation is allowed while a second restore operation is executing).

Figure 6:
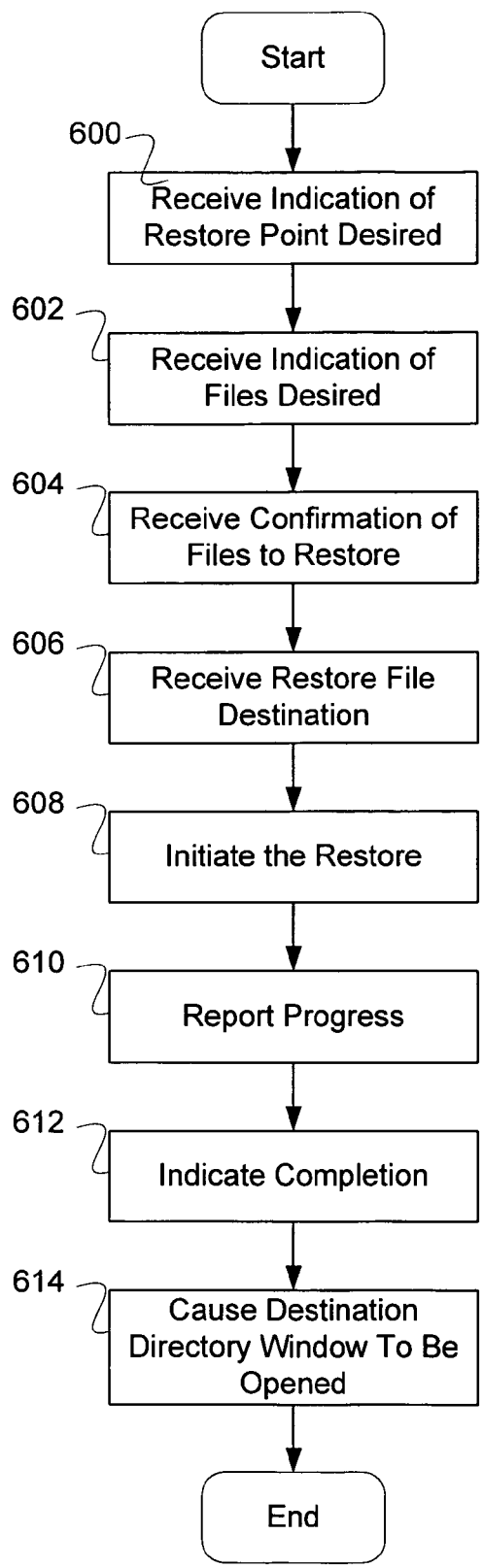
FIG. 6 is a flow diagram illustrating an embodiment of a process for executing a restore operation requested by a client computer.

FIG. 6 is a flow diagram illustrating an embodiment of a process for executing a restore operation requested by a client computer. In some embodiments, the process in FIG. 6 is used to implement 506 in FIG. 5 for a restore operation. In the example shown, in 600 an indication is received of a restore point desired. In various embodiments, the restore point is indicated by clicking on a selection in a window, by typing a snapshot, by selecting from a pull down menu, or any other appropriate way of indicating a restore point. In some embodiments, a restore point comprises a snapshot, e.g., of a file system and/or volume associated with the requesting client. In 602, an indication is received of one or more files desired to be restored. In various embodiments, the one or more files are indicated by clicking on a selection in a window, by typing the one or more file names in a list, by selecting from a pull down menu, or any other appropriate way of indicating one or more file names. In 604, confirmation is received of the one or more files to restore. In various embodiments, confirmation is indicated by clicking a button in a window, checking a box, or any other appropriate way of indicating confirmation. In 606, the destination for the one or more files to restore is received. In various embodiments, the destination is indicated by selecting a destination directory by clicking on a directory in a window, typing in a path, browsing for a destination, or any other appropriate way of indicating a destination. In 608, the restoration of the one or more files is initiated. In some embodiments, initiating the restoration comprises causing a process to start the restoration to a destination directory on a client computer of the one or more files from a backup set as indicated by the selection of a restore point and selection of the one or more files. In 610, progress is reported. In some embodiments, progress is reported by indicating the percentage completion of the restoration. In some embodiments, progress is reported from the process restoring the one or more files to the client computer. In 612, completion is indicated. In some embodiments, the process restoring to the client computer indicates completion when the one or more files have been successfully restored to the client computer. In 614, a destination directory window is caused to be opened. In some embodiments, a window is opened on the client computer showing the destination directory with the restored files.

Figure 7:
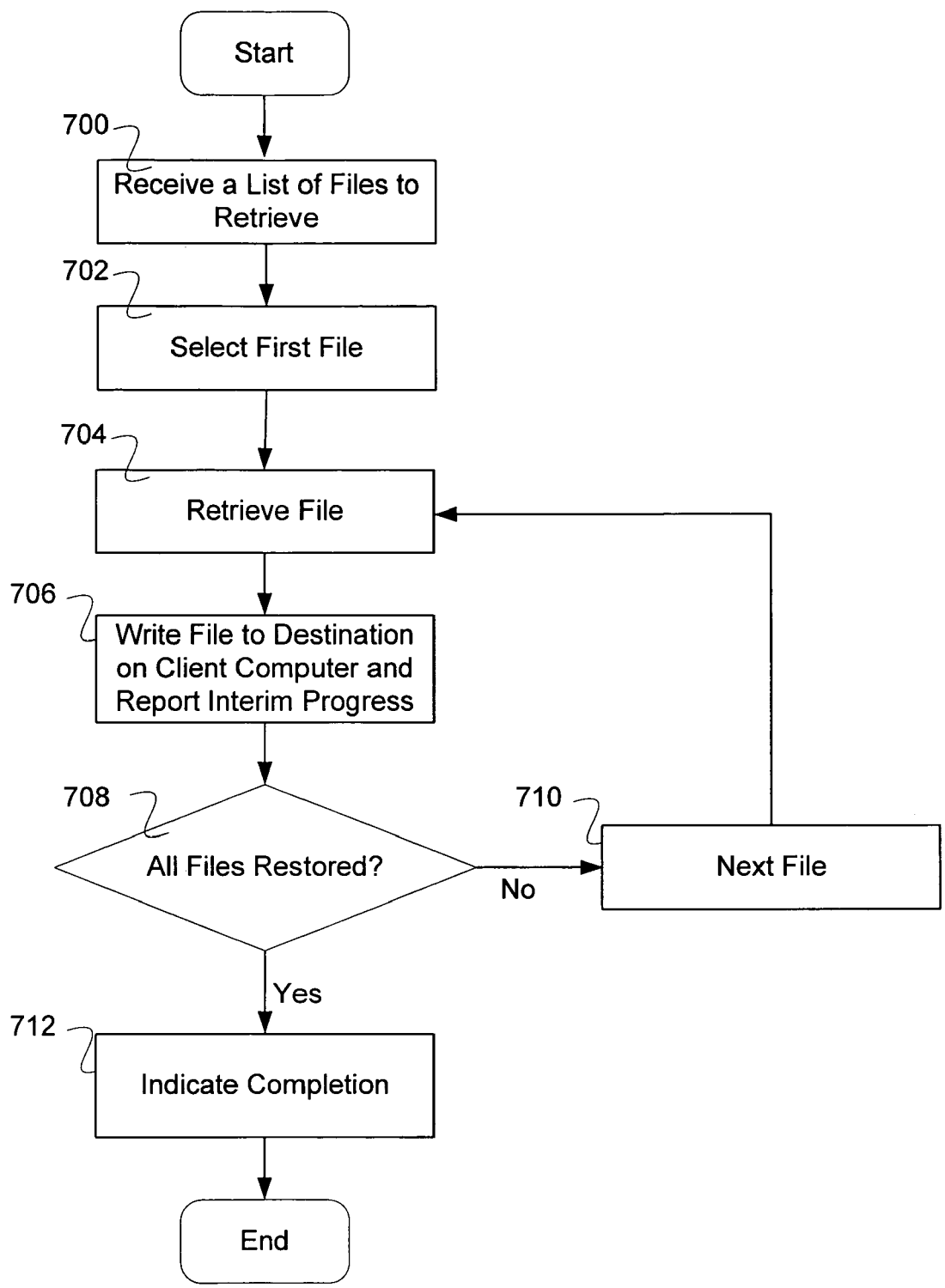
FIG. 7 is a flow diagram illustrates an embodiment of a process for restoring one or more files to a client computer.

FIG. 7 is a flow diagram illustrates an embodiment of a process for restoring one or more files to a client computer. In some embodiments, the process of FIG. 7 is used to implement a process that is initiated in 608 of FIG. 6. In the example shown, in 700 a list of file to restore is received. In some embodiments, the list of files is received indicating which file(s) to restore to the client computer. In 702, a first file is selected. In some embodiments, the process selects a file to be transferred first. In various embodiments, the first file in the list, the last file in the list, or any other file in the list is selected. In 704, the selected file is retrieved. In some embodiments, the file is retrieved by copying the appropriate file from a backup set, where the appropriate file has been selected by selecting a file in a restore point. In 706, the file is written to a destination directory on a client computer and progress is reported. In 708, it is determined if all the files in the list to be restored have been restored. If all the files have not been restored, then in 710 the next file is selected and control is passed to 704. If all the files have been restored, then in 712 completion of the restore is indicated. In some embodiments, the completion of the restore process is indicated if the retrieval and transfer of the files in the list between the backup set and the client user computer is complete.

Figure 8:
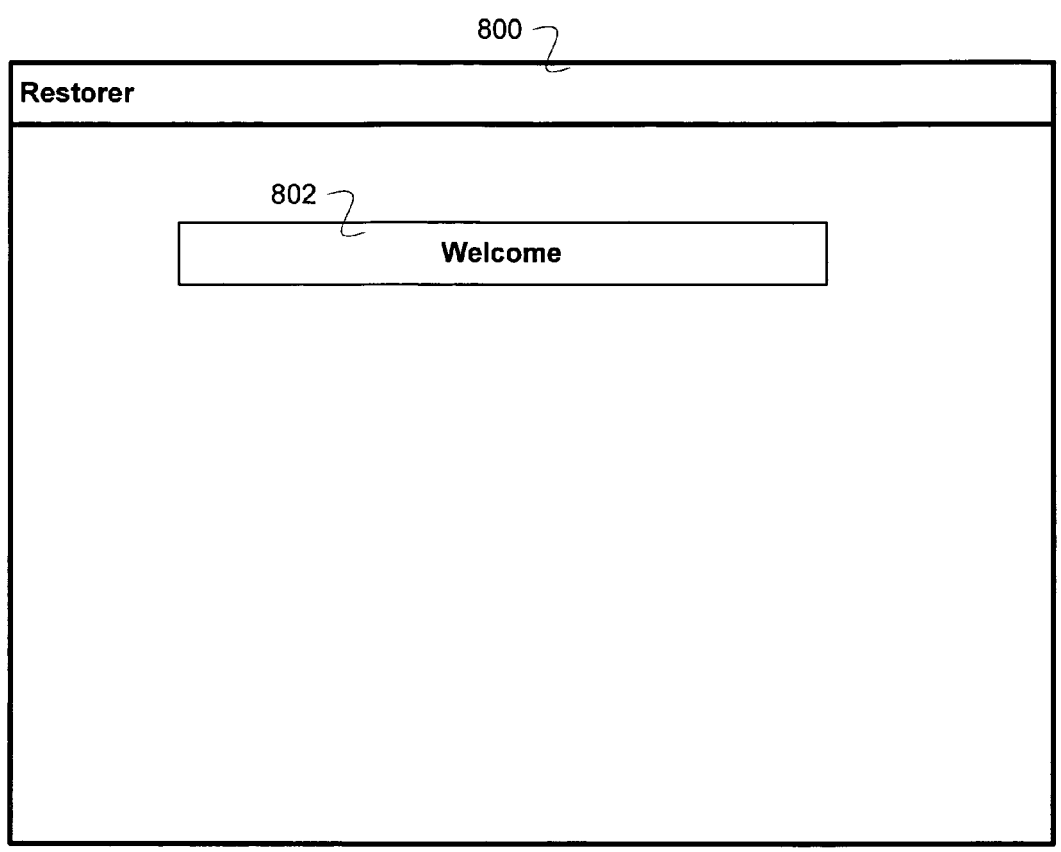
FIG. 8 is a block diagram illustrating an example of a welcome screen in one embodiment.

FIG. 8 is a block diagram illustrating an example of a welcome screen in one embodiment. In some embodiments, the screen in FIG. 8 is displayed for a user on a client computer as part of 500 in FIG. 5. In the example shown, window 800 is a restore window with a welcome message. In some embodiments, a client application displays the restore welcome window once a user requests to perform a restore operation.

Figure 9:
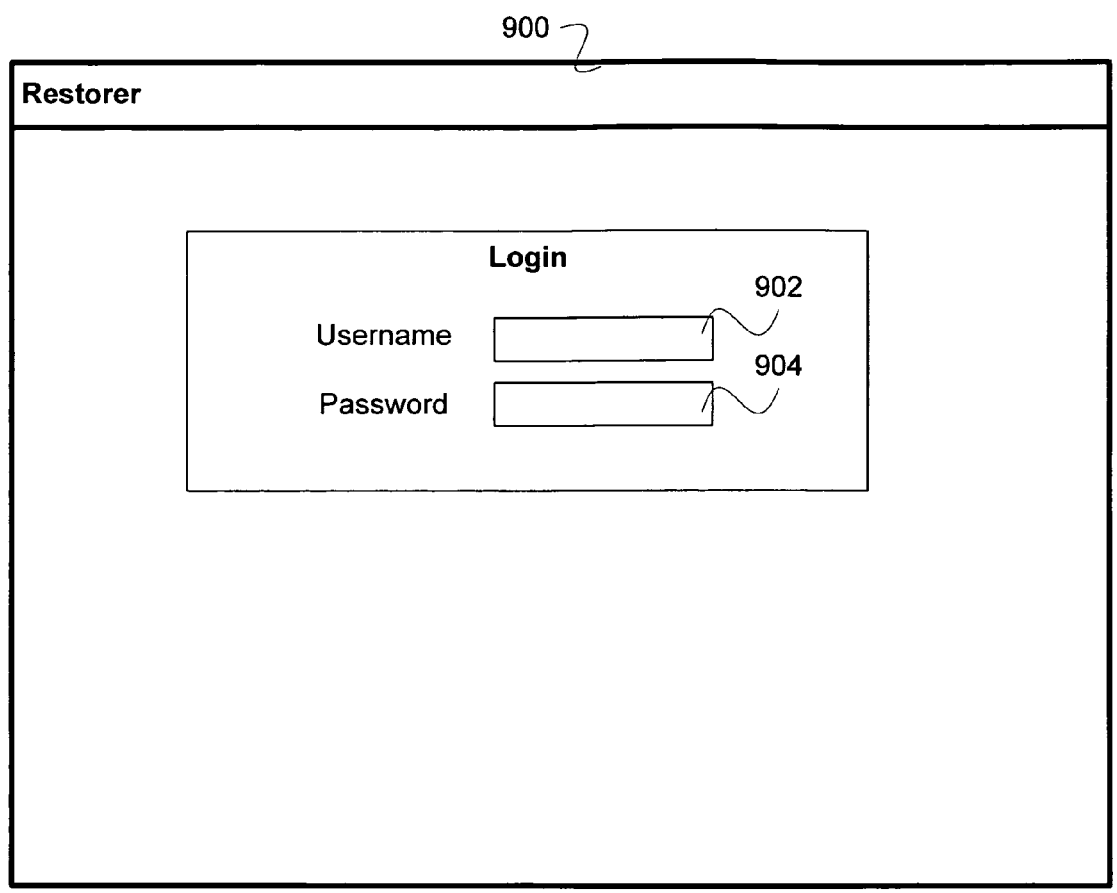
FIG. 9 is a block diagram illustrating an example of a login screen in one embodiment.

FIG. 9 is a block diagram illustrating an example of a login screen in one embodiment. In some embodiments, the screen in FIG. 9 is displayed for a user on a client computer in order to receive login information referred to in 502 of FIG. 5. In the example shown, window 900 is a restore window where a login username and password can be typed into input field 902 and 904 respectively. In various embodiments, login information is entered using a selection method (for example, pull down menus), automatically by the client application, or any other appropriate way to input login information. In some embodiments, a login screen is not displayed to the user.

Figure 10:
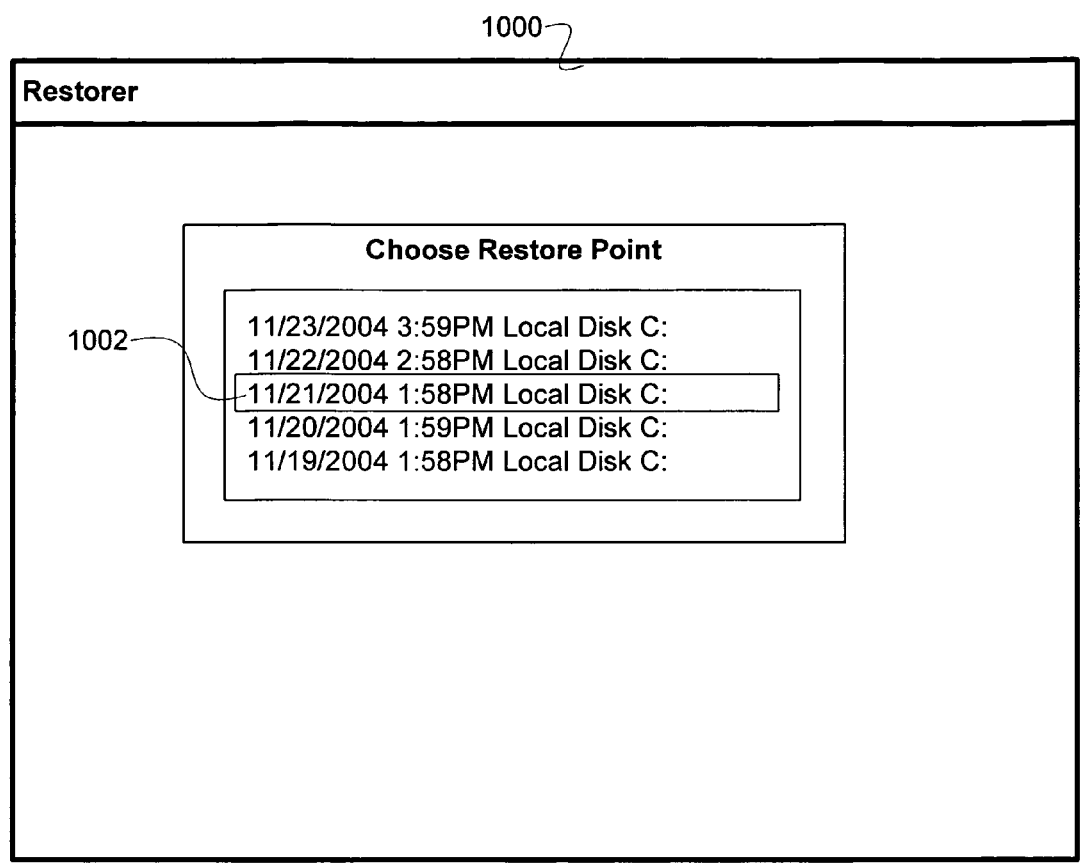
FIG. 10 is a block diagram illustrating an example of a restore point selection screen in one embodiment.

FIG. 10 is a block diagram illustrating an example of a restore point selection screen in one embodiment. In some embodiments, the screen in FIG. 10 is displayed for a user on a client computer in order to receive restore point selection information referred to in 600 of FIG. 6. In the example shown, window 1000 is a restore window where a restore point can be selected by clicking on a restore point (for example, selecting restore point 1002). In various embodiments, restore point information is entered using other selection methods (for example, pull down menus, radio buttons, check boxes, etc.), typing in a restore point date and time, or any other appropriate way to input selection information.

Figure 11:
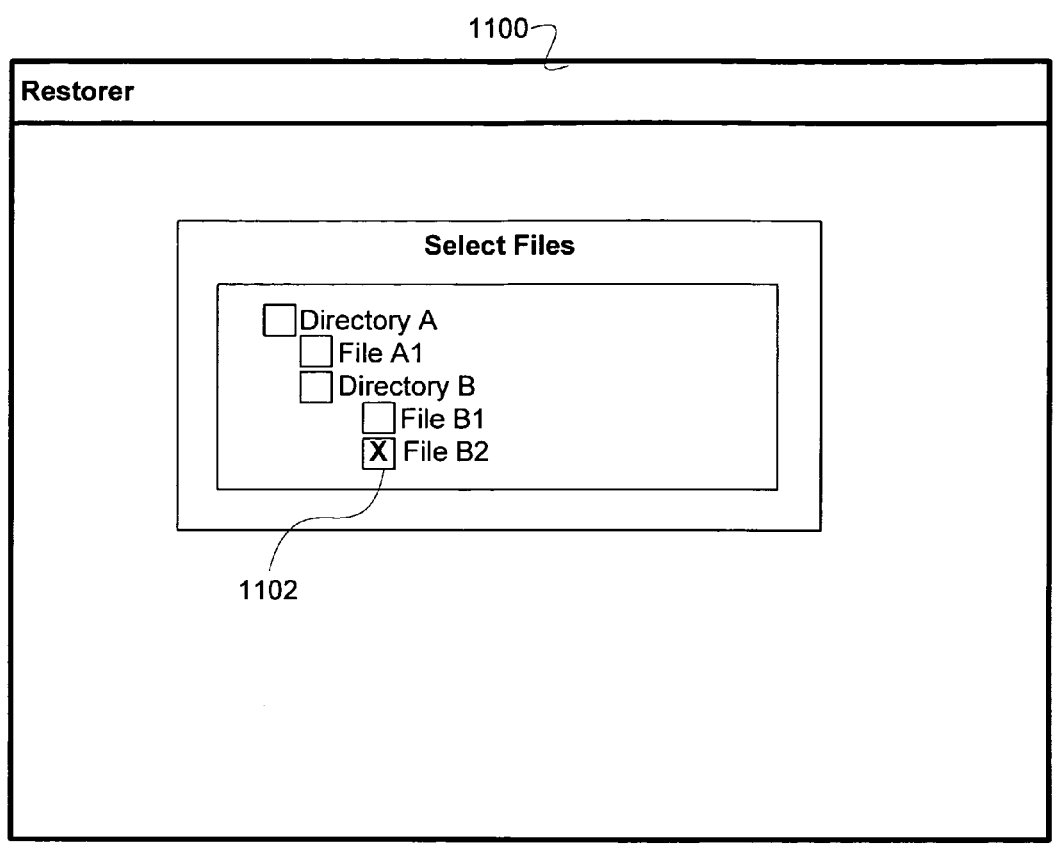
FIG. 11 is a block diagram illustrating an example of a file selection screen in one embodiment.

FIG. 11 is a block diagram illustrating an example of a file selection screen in one embodiment. In some embodiments, the screen in FIG. 11 is displayed for a user on a client computer in order to receive file selection information referred to in 602 of FIG. 6. In the example shown, window 1100 is a restore window where files can be selected by checking on a box adjacent to a file name (for example, file B2 by checking box 1102). In various embodiments, file information is entered using other selection methods (for example, pull down menus, radio buttons, highlighting, etc.), typing in a file name or path, or any other appropriate way to input file name information.

Figure 12:
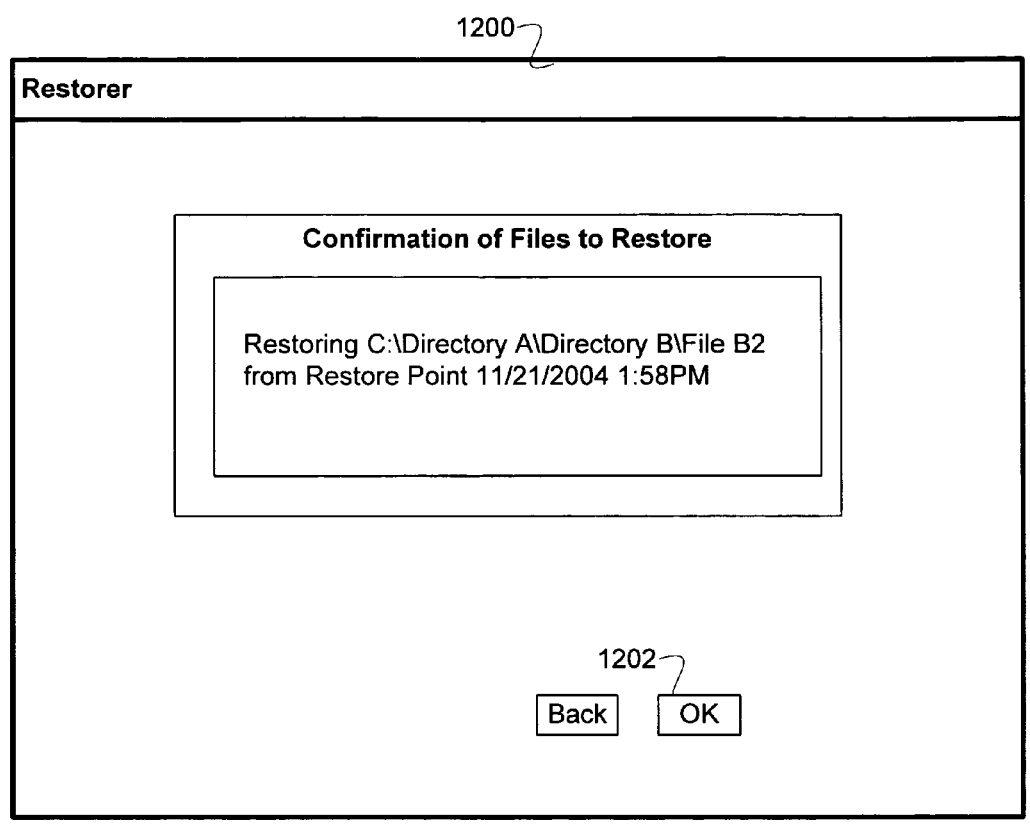
FIG. 12 is a block diagram illustrating an example of a file confirmation screen in one embodiment.

FIG. 12 is a block diagram illustrating an example of a file confirmation screen in one embodiment. In some embodiments, the screen in FIG. 12 is displayed for a user on a client computer in order to confirm file selection information referred to in 604 of FIG. 6. In the example shown, window 1200 is a restore window where files can be confirmed by clicking on an 'OK' box (for example, box 1202). In various embodiments, file confirmation is entered using other methods (for example, pull down menus, radio buttons, highlighting, etc.) or any other appropriate way to confirm file name information.

Figure 13:
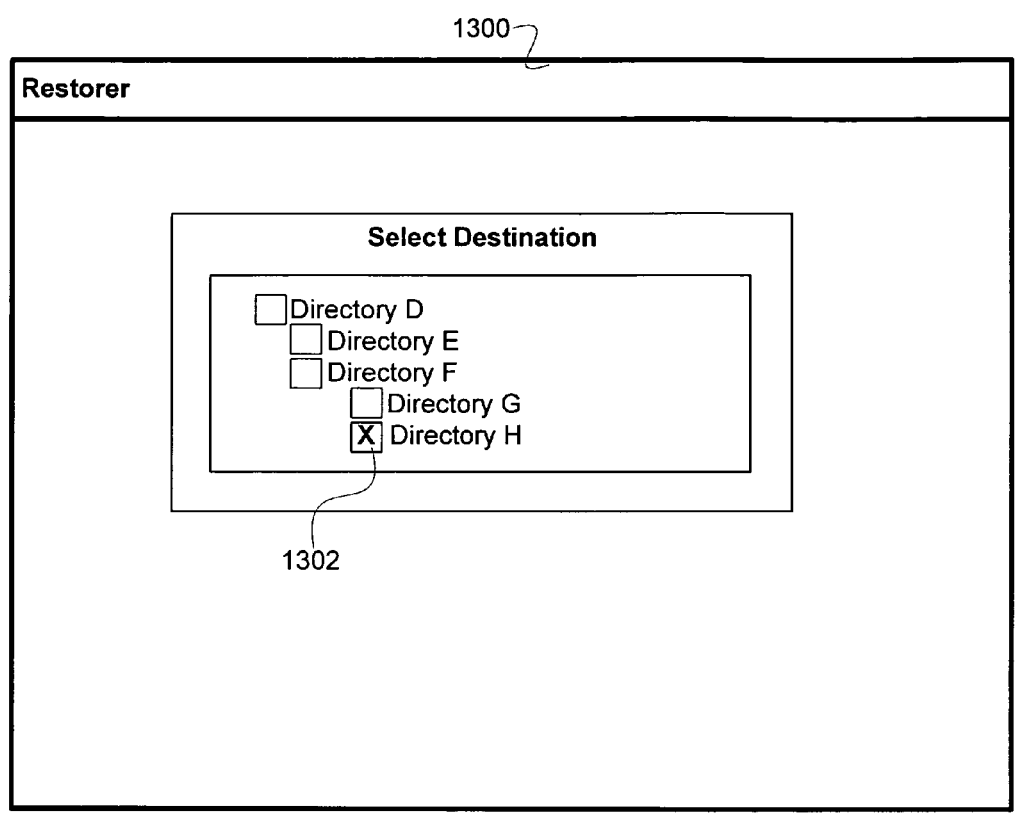
FIG. 13 is a block diagram illustrating an example of a destination directory selection screen in one embodiment.

FIG. 13 is a block diagram illustrating an example of a destination directory selection screen in one embodiment. In some embodiments, the screen in FIG. 13 is displayed for a user on a client computer in order to receive destination directory information referred to in 606 of FIG. 6. In the example shown, window 1300 is a restore window where a destination directory on the client computer can be selected by checking on a box adjacent to a directory name (for example, directory H by checking on box 1302). In various embodiments, destination directory information is entered using other selection methods (for example, pull down menus, radio buttons, highlighting, etc.) or any other appropriate way to input directory destination information.

Figure 14:
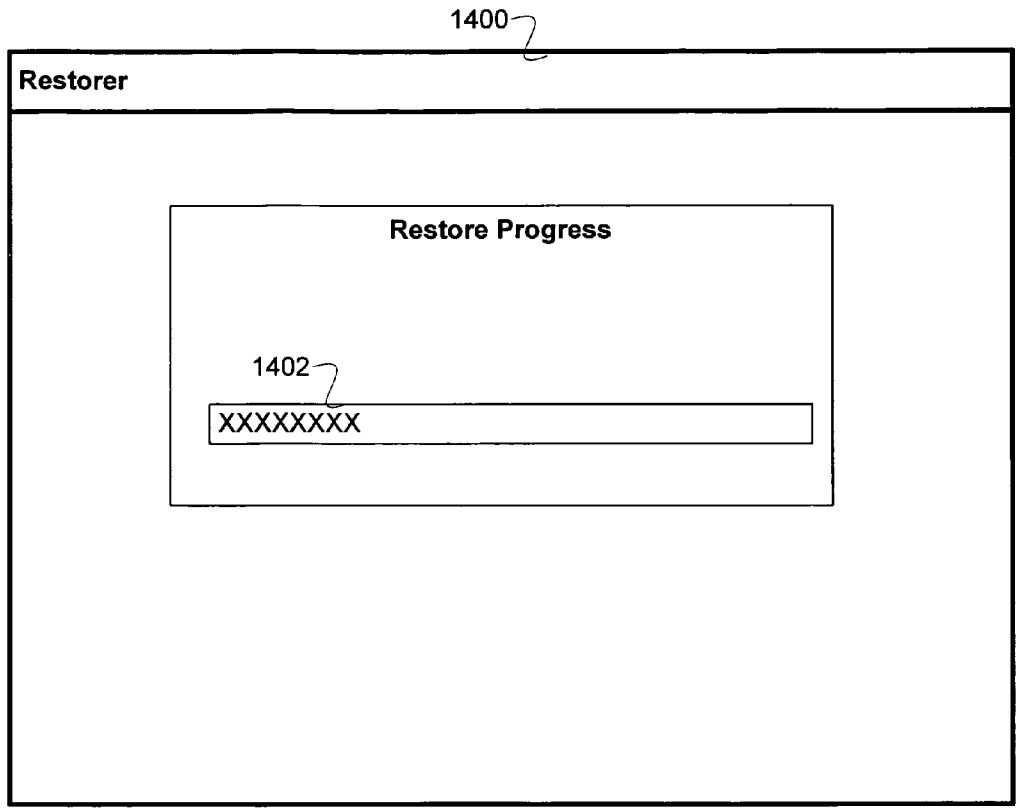
FIG. 14 is a block diagram illustrating an example of a progress screen in one embodiment.

FIG. 14 is a block diagram illustrating an example of a progress screen in one embodiment. In some embodiments, the screen in FIG. 14 is displayed for a user on a client computer in order to display progress information referred to in 610 of FIG. 6. In the example shown, window 1400 is a restore window where progress bar 1402 indicates progress information. In various embodiments, progress information is displayed using other graphical methods (for example, pie chart, clock, moving dots, etc.) or using a numerical field (for example, a field with a percentage number displayed), and/or any other appropriate way to display progress information. In some embodiments, a progress screen is not displayed to the user.

Figure 15:
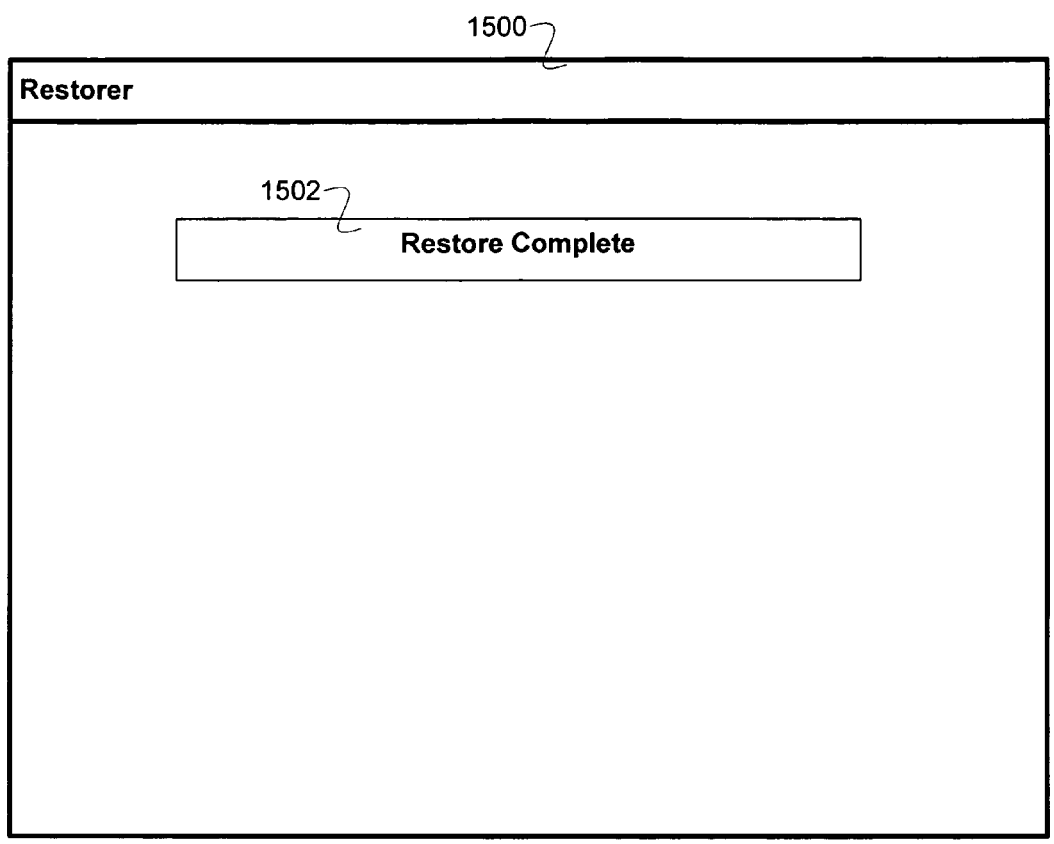
FIG. 15 is a block diagram illustrating an example of a completion screen in one embodiment.

FIG. 15 is a block diagram illustrating an example of a completion screen in one embodiment. In some embodiments, the screen in FIG. 15 is displayed for a user on a client computer in order to display completion information referred to in 612 of FIG. 6. In the example shown, window 1500 is a restore window where completion text box 1502 indicates completion information. In various embodiments, completion information includes information such as the files restored, the destination directory, the number of bytes transferred, the restore point source, etc. In some embodiments, a completion screen is not displayed to the user.

Figure 16:
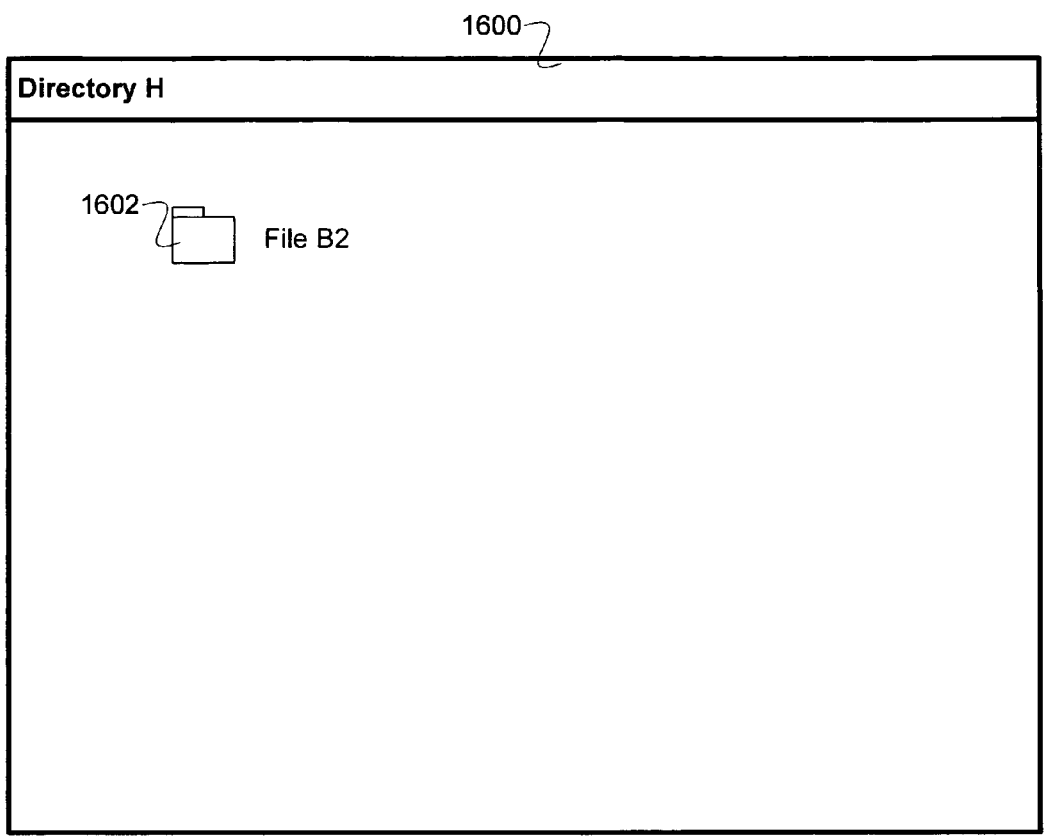
FIG. 16 is a block diagram illustrating an example of a destination directory screen in one embodiment.

FIG. 16 is a block diagram illustrating an example of a destination directory screen in one embodiment. In some embodiments, the screen in FIG. 16 is displayed for a user on a client computer in order to display destination directory information referred to in 614 of FIG. 6. In the example shown, window 1600 is a directory window displaying one or more restoration files, represented in this example by file B2 and file icon 1602. In some embodiments, file icon 1602 is associated with a shortcut or other link such that user selection of file icon 1602 results in the restored file being accessed and opened. In some embodiments, a destination directory window is not displayed to the user. In some embodiments, a client application and/or agent installed on the client computer to which the files have been restored is invoked and used to provide the destination directory screen shown in FIG. 16. In some embodiments, a backup application that restored the files communicates via a private communication path (e.g., port) with an associated client application and/or agent to cause the client application and/or agent to provide the display and interface shown in FIG. 16.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for enabling a client to restore comprising:
receiving at a processor from a first client computer an indication that a first restore operation is desired and executing the first restore operation;
receiving at the processor a login information from a second client computer over at least a portion of a first communication path, wherein the login information was input by a user; and
confirming the login information by querying a trusted agent configured to run on the second client computer over at least a portion of a second communication path, wherein confirmation of the login information enables the user to initiate an operation that is appropriate based at least in part on access privileges associated with the user;
receiving at the processor from the second client computer, subsequent to starting the execution of the first restore operation, an indication that a second restore operation is desired to be executed during the current execution of the first restore operation;
controlling access by the processor for executing multiple at least partially contemporaneous restore operations from the first and the second client computers by checking whether the second restore operation requested by the second client computer is allowed to execute given the first restore operation requested by the first client computer is currently executing based at least in part on reading allowed predetermined combinations of requested operations and executing operations; and
in the event that the second restore restoration operation is allowed to execute, providing to the second client computer access to a backup data associated with the second client computer based at least in part on a selected restore point while the first restore operation is currently executing, wherein the backup data associated with the second client computer comprises a subset of a backup data set that includes both backup data associated with the second client computer and backup data not associated with the second client computer, wherein the selected restore point refers to data in one or more sets of backup session data that indicate for each element of the backup data associated with the second client computer the backup session during which that element, as it existed at a backup time associated with the selected restore point, was stored.

2. The method as in claim 1, wherein the indication includes restore point information.

3. The method as in claim 1, further comprising executing multiple restore operations from one or more client computers.

4. The method as in claim 1, further comprising:
identifying the subset of the backup data set; and
not providing access to portions of the backup data set not included in the subset of the backup data set.

5. A computer program product for enabling a client to restore, the computer program product being embodied in a computer non-transitory readable storage medium and comprising computer instructions for:
receiving at a processor from a first client computer an indication that a first restore operation is desired and executing the first restore operation;
receiving at the processor a login information from a second client computer over at least a portion of a first communication path, wherein the login information was input by a user; and
confirming the login information by Querying a trusted agent configured to run on the second client computer over at least a portion of a second communication path, wherein confirmation of the login information enables the user to initiate an operation that is appropriate based at least in part on access privileges associated with the user;
receiving at the processor from the second client computer, subsequent to starting the execution of the first restore operation, an indication that a second restore operation is desired to be executed during the current execution of the first restore operation;
controlling access by the processor for executing multiple at least partially contemporaneous restore operations from the first and the second client computers by checking whether the second restore operation requested by the second client computer is allowed to execute given the first restore operation requested by the first client computer is currently executing based at least in part on reading allowed predetermined combinations of requested operations and executing operations; and in the event that the second restore restoration operation is allowed to execute, providing to the second client computer access to a backup data associated with the second client computer based at least in part on a selected restore point while the first restore operation is currently executing, wherein the backup data associated with the second client computer comprises a subset of a backup data set that includes both backup data associated with the second client computer and backup data not associated with the second client computer, wherein the selected restore point refers to data in one or more sets of backup session data that indicate for each element of the backup data associated with the second client computer the backup session during which that element, as it existed at a backup time associated with the selected restore point, was stored.

6. A system for enabling a client to restore comprising:
a processor; and
a memory coupled with the processor, wherein the memory is configured to provide the processor with instructions which when executed cause the processor to:
receive from a first client computer an indication that a first restore operation is desired;
receive at the processor a login information from a second client computer over at least a portion of a first communication path, wherein the login information was input by a user; and
confirm the login information by querying a trusted agent configured to run on the second client computer over at least a portion of a second communication path, wherein confirmation of the login information enables the user to initiate an operation that is appropriate based at least in part on access privileges associated with the user;
receive from the second client computer, subsequent to starting the execution of the first restore operation, an indication that a second restore operation is desired to be executed during the current execution of the first restore operation;
control access for executing multiple at least partially contemporaneous restore operations from the first and the second client computers by checking whether the second restore operation requested by the second client computer is allowed to execute given the first restore operation requested by the first client computer is currently executing based at least in part on reading allowed predetermined combinations of requested operations and executing operations;
and
in the event that the second restore restoration operation is allowed to execute, provide to the second client computer access to a backup data associated with the second client computer based at least in part on a selected restore point while the first restore operation is currently executing, wherein the backup data associated with the second client computer comprises a subset of a backup data set that includes both backup data associated with the second client computer and backup data not associated with the second client computer, wherein the selected restore point refers to data in one or more sets of backup session data that indicate for each element of the backup data associated with the second client computer the backup session during which that element, as it existed at a backup time associated with the selected restore point, was stored.

7. The system as in claim 6, wherein the indication includes restore point information.

8. The system as in claim 6, wherein the memory is further configured to provide the processor with instructions which when executed cause the processor to execute the second restore operation.

9. The system as in claim 6, wherein the memory is further configured to provide the processor with instructions which when executed cause the processor to execute multiple restore operations from one or more client computers.

10. The system as in claim 6, wherein the subset of the backup data set comprises data accessible to the user using the second client computer.

11. The system as in claim 6, wherein the subset of the backup data set comprises backup data corresponding to data stored on the second client computer.

12. The system as in claim 6, wherein the memory is further configured to provide the processor with instructions which when executed cause the processor to:
identify the subset of the backup data set; and
not provide access to portions of the backup data set not included in the subset of the backup data set.

13. The system as in claim 6, wherein the memory is further configured to provide the processor with instructions which when executed cause the processor to receive a selection of the restore point.

14. The system as in claim 6, wherein the memory is further configured to provide the processor with instructions which when executed cause the processor to receive a selection of a destination directory.

15. The system as in claim 6, wherein the memory is further configured to provide the processor with instructions which when executed cause the processor to receive a selection of one or more files to restore.

16. The system as in claim 6, wherein the memory is further configured to provide the processor with instructions which when executed cause the processor to receive a confirmation of one or more files to restore.

17. The system as in claim 6, wherein the memory is further configured to provide the processor with instructions which when executed cause the processor to cause a destination directory to be displayed.

18. The system as in claim 6, wherein providing to the second client computer access to a backup data associated with the second client computer includes displaying a list of restore points associated with the second client computer.

19. The system as in claim 6, wherein providing to the second client computer access to a backup data associated with the second client computer includes displaying a list of files associated with the second client computer.

20. The system as in claim 6, wherein providing to the second client computer access to a backup data associated with the at least one other client computer includes providing via the second client computer an interface usable to select and indicate a file to be restored to the second client computer using the backup data.

* * * * *